United States Patent
Griessl et al.

(10) Patent No.: US 6,959,118 B2
(45) Date of Patent: Oct. 25, 2005

(54) METHOD AND SYSTEM FOR THE ESTIMATION AND COMPENSATION OF BRIGHTNESS CHANGES FOR OPTICAL FLOW CALCULATIONS

(75) Inventors: Max Griessl, Munich (DE); Markus Wittkop, Ismaning (DE); Siegfried Wonneberger, Munich (DE)

(73) Assignee: Dynapel Systems, Inc., New York, NY (US)

(*) Notice: Subject to any disclaimer, the term of this patent is extended or adjusted under 35 U.S.C. 154(b) by 448 days.

(21) Appl. No.: 10/101,238

(22) Filed: Mar. 20, 2002

(65) Prior Publication Data

US 2002/0163596 A1 Nov. 7, 2002

Related U.S. Application Data

(60) Provisional application No. 60/278,443, filed on Mar. 26, 2001.

(51) Int. Cl.[7] ............................ G06K 15/00; H04N 1/46
(52) U.S. Cl. ........................................ 382/274; 358/520
(58) Field of Search .................................. 382/274, 190, 382/206, 286; 358/520, 530, 475, 509; 348/14–15; 345/690; 386/110, 11

(56) References Cited

U.S. PATENT DOCUMENTS

| | | | | |
|---|---|---|---|---|
| 5,479,188 A | * | 12/1995 | Moriyama | .................. 345/89 |
| 5,708,480 A | | 1/1998 | Bromba | |
| 5,831,638 A | * | 11/1998 | West et al. | .................. 345/539 |
| 5,917,990 A | * | 6/1999 | Zamara et al. | ................. 386/95 |
| 6,228,030 B1 | | 5/2001 | Urbano | |
| 6,346,079 B1 | | 2/2002 | Haider | |
| 6,434,322 B1 | * | 8/2002 | Kimura et al. | ................. 386/94 |
| 2002/0089675 A1 | | 7/2002 | Kamon | |
| 2002/0097252 A1 | * | 7/2002 | Hirohata | ..................... 345/690 |
| 2002/0163596 A1 | * | 11/2002 | Griessl et al. | .............. 348/701 |

FOREIGN PATENT DOCUMENTS

| | | | | |
|---|---|---|---|---|
| JP | 7225196 | * | 8/1995 | ............ G09G/3/20 |
| JP | 08184812 | * | 7/1996 | ............ G02F/1/133 |
| JP | 2001154630 | * | 6/2001 | ............ G01B/11/20 |
| WO | WO 01/96982 | | 12/2001 | |

* cited by examiner

*Primary Examiner*—Jerome Grant, II
(74) *Attorney, Agent, or Firm*—Venable, LLP; Ralph P. Albrecht

(57) ABSTRACT

In a video processing system scene shifts are detected and the need for adjusting the brightness between pairs of adjacent frames of a video motion picture is assessed. The need for brightness adjustment is assessed and a possible scene shift is detected by identifying homogeneous pixels in at least one frame of a pair of adjacent frames of the motion picture. The brightness of one of the adjacent frames is then adjusted and a scene shift is detected based on the ratio of the number of homogeneous pixels undergoing a substantial change in brightness relative to the total number of homogeneous pixels identified. When a need for a brightness adjustment is determined the brightness of one of the frames is adjusted before estimating optical flow between the frames.

14 Claims, 4 Drawing Sheets

METHOD AND SYSTEM FOR THE ESTIMATION AND COMPENSATION OF BRIGHTNESS CHANGES FOR OPTICAL FLOW CALCULATIONS

CROSS-REFERENCE TO RELATED APPLICATIONS

This application claims the benefit of now abandoned provisional application Ser. No. 60/278,443 filed Mar. 26, 2001.

BACKGROUND OF THE INVENTION

1. Field of the Invention

The present invention is directed generally to methods and systems related to processing and manipulating video images and more specifically to the analysis and preparation of consecutive images with respect to non-motion brightness changes to improve the estimation of dense motion fields in sequences of images, such as, e.g. video images, by optical flow computation.

2. Related Art

An example of motion estimation by optical flow computation is set forth in application Ser. No. 09/593,521, filed Jun. 14, 2000, entitled "System for the Estimation of Optical Flow," invented by Siegfried Wonneberger, Max Griessl and Markus Wittkop. This application is hereby incorporated by reference. Motion estimation by optical flow computation between two consecutive images of a sequence is limited by the fact that the optical flow constraint does not allow for brightness changes between the two images when the brightness change is not due to motion. Therefore, brightness changes not caused by motion often lead to extremely incorrect motion fields and can even cause the breakdown of the motion estimation process. Simply identifying that a brightness change is not due to motion can be challenging, due to the variety of sources causing the brightness change, e.g. camera motion, object motion, innovations, occlusions, flashlights and scene-shifts. What is needed, then, is the ability to free the images from non-motion brightness changes before the motion is estimated.

SUMMARY OF THE INVENTION

Advantageously, the present invention examines the brightness changes between two images by examining the brightness change of certain homogeneous pixels and classifying the transitions into five categories: "harmless", "brighten image 1", "brighten image 2", "scene-shift" and "unclear". When the transition is "harmless" or "unclear", the original images are unchanged and can proceed to motion estimation. When the transition is "brighten image 1" or "brighten image 2", the luminance values of the darker image are re-scaled before the image is used for motion estimation. No motion estimation is performed at all when the transition is a scene-shift. A scene shift, also called a scene cut, describes the occurrence in a motion picture when the camera scene display is switched to a different scene or a different view in one frame interval. Thus adjacent frames bridging a scene shift do not represent or correspond to object or background motion. The present invention advantageously prevents the calculation of wrong motion fields and prevents the breakdown of the motion estimation process by identifying scene-shifts where motion estimation is inappropriate and by correcting brightness differences where needed.

As indicated above, the system of the invention identifies scene shifts. The scene shift identification system of the present invention is useful in other video processing applications, in which there is a need to know, where in the frame sequence scene shifts have occurred. For example, the video processing system described in co-pending application Ser. No. 10/025,888, filed Dec. 26, 2001, entitled "Video Superframe Display System," invented by Steven D. Edelson has a need to determine where scene shifts occur. In the system of this co-pending application, the scene shifts are identified so that they can be used as logical points to divide the sequence of frames of the motion picture into subsequences before combining the frames of the subsequences into mosaics.

DESCRIPTION OF THE INVENTION

Figure 1:
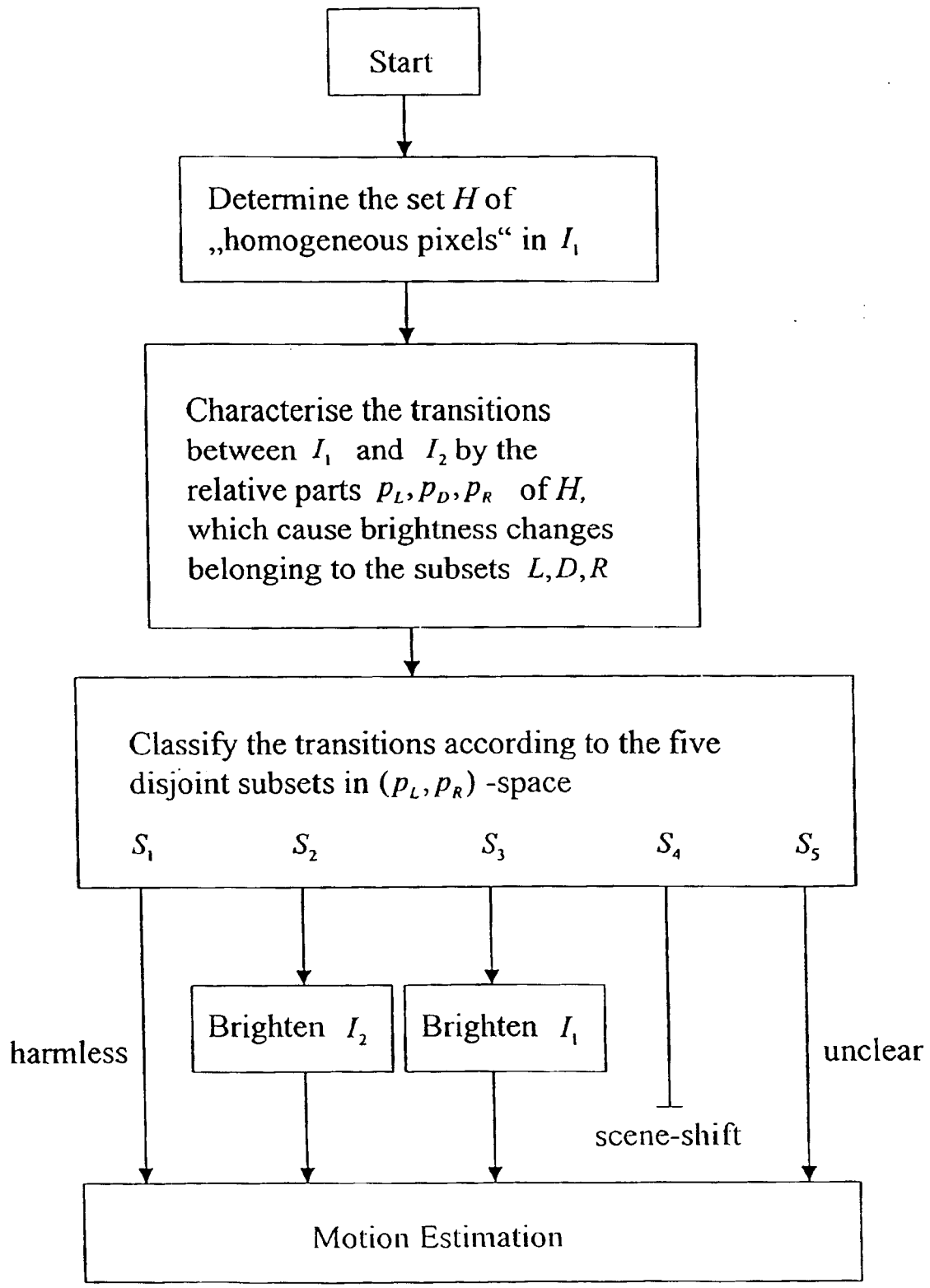
FIG. 1 is a flow chart describing the process of preparing a frame for the motion estimation calculation.
Figure 2:
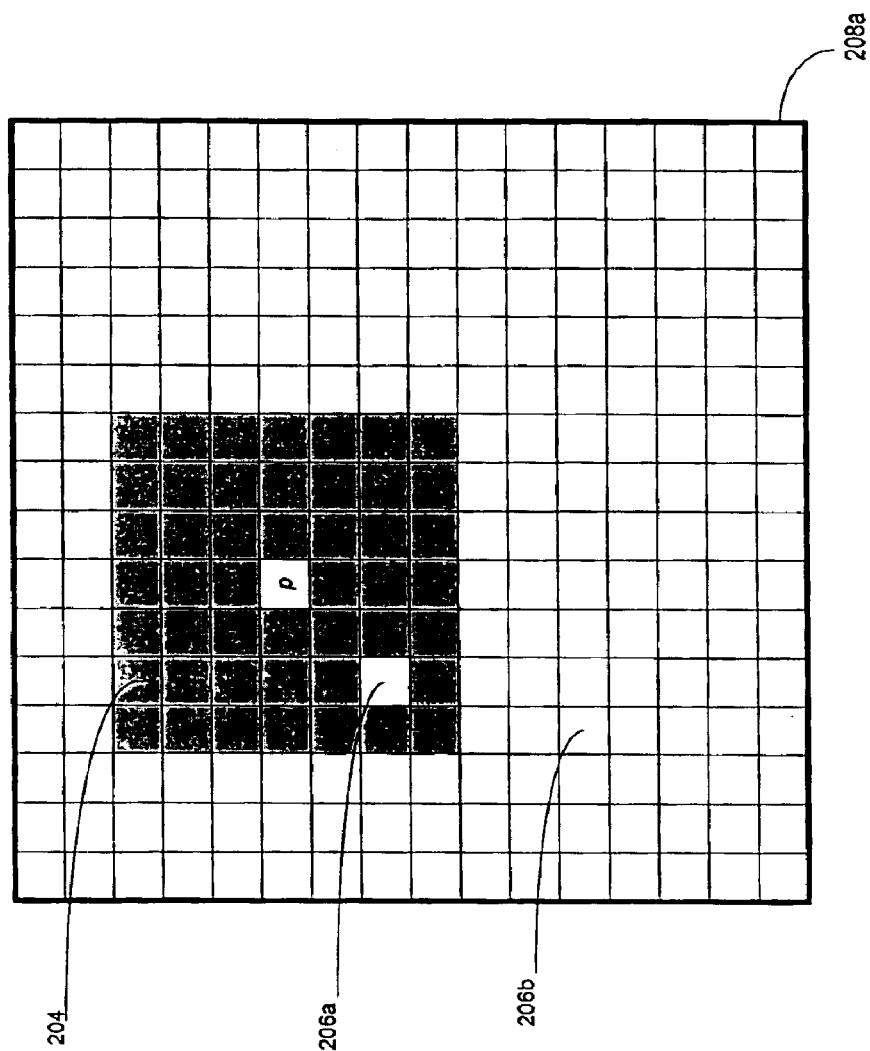
FIG. 2 depicts the neighborhood of a pixel and the homogeneous pixels in a frame.

For the purposes of the present invention, the term "pixel" is taken to mean a fixed point in the frame. As shown in FIG. 2, for any pixel p in a frame 208a, a neighborhood N(p) is described as being the set of pixels in the frame that are less than or equal to a maximal vertical and horizontal coordinate distance B away from pixel p, or $$N(p):=\{p' \in F: \|p'-p\| \leq B\}, \text{ where } \|x\|:=\max(x_v, x_h).$$

In a preferred embodiment, the maximal distance B is three. In FIG. 2, an example neighborhood is represented by the 7×7 square designated by reference number 204. The pixel 206a belongs to the neighborhood of pixel p, while pixel 206b does not.

The analysis of the brightness changes between two luminance images $I_1$ and $I_2$ begins with determining the set of "homogeneous pixels", H, in each frame F. The set of homogeneous pixels is defined as the set of all pixels p in the frame, such that the difference in the luminance values of p and all p' in the neighborhood of pixel p, is less than some tolerance T, or $$H:=\{p \in F: |I_1(p')-I_1(p)| < T(I_1(p)), \forall p' \in N(p)\}.$$

Tolerance T(I) is a positive function of the luminance. In a preferred embodiment, tolerance is defined to be $$T(I):=5+40 \cdot (I/I_{max}) \text{ and } I_{max}=255.$$

Note that the pixels in H do not necessarily have neighbors, which lie in H too.

The use of the pixel neighborhood in determining membership in the set H is important. "Homogeneous pixels" are, by definition, similar to all their neighbors in terms of brightness. If a pixel is part of an object in motion, the brightness of the pixel can change due to the motion particularly if the border of a depicted object passes over the pixel in question. By limiting the pixels of set H to pixels which are in the middle of a set of similar neighboring pixels, the pixels of set H are prevented from being changed substantially in brightness due to the depicted motion. The object surface portion represented by the similar neighboring pixel may move, but this action will merely bring another pixel sized part of the object surface portion into alignment with the pixel in question. Accordingly the motion will not cause a substantial change in brightness of the "homogeneous pixel".

Figure 3:
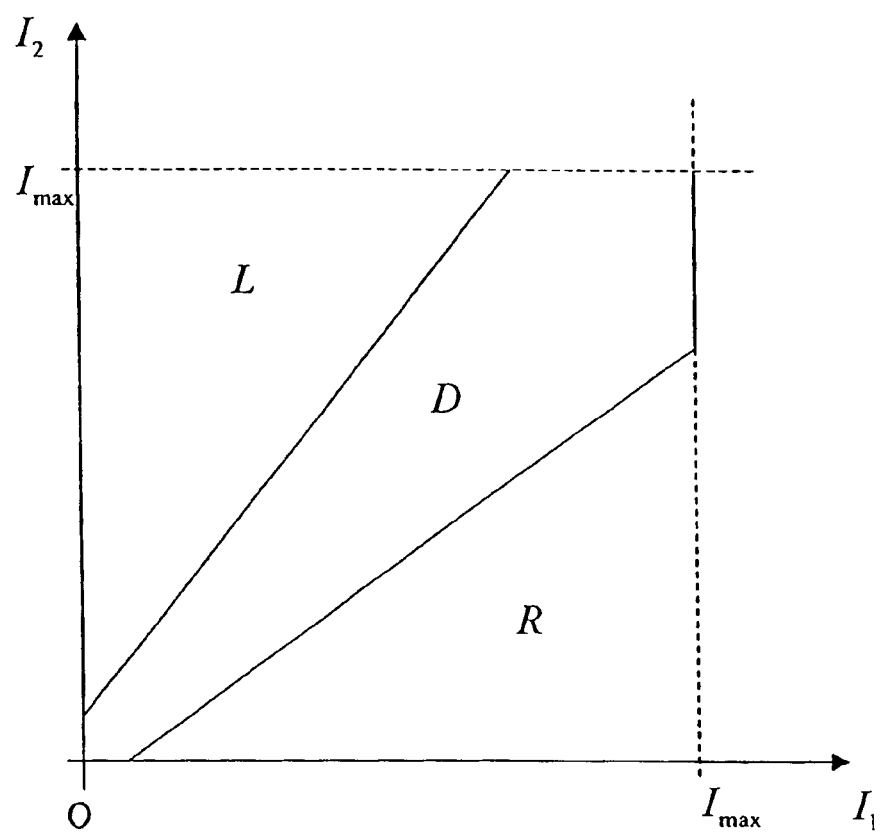
FIG. 3 graphs the brightness change of a pixel from one image to the next image.

For each pixel p which is part of the set of homogeneous pixels H, the pair of luminance values $(I_1(p), I_2(p))$ of a pixel in image 1 of the first frame and image 2 of the second frame defines a point on the luminance square $[0, I_{max}] \times [0, I_{max}]$, where $I_{max}$ is the maximal possible luminance in the video sequence, as shown in FIG. 3. This luminance square can be divided into three disjoint sub-regions, L, D, and R. Sub-region D is an area of the luminance square of FIG. 3 which is generally symmetric with respect to the diagonal line from $[0, 0]$ to $[I_{max}, I_{max}]$. L and R are the remaining upper left and lower right triangles. Sub-region D can be more formally defined as a diagonal set made of the pairs of luminance values within the range $[0, I_{max}] \times [0, I_{max}]$, where the difference in the luminance from image 1 to image 2 is within a tolerance T of image 1, or:

$$D := \{(I_1, I_2) \in [0, I_{max}] \times [0, I_{max}] : |I_2 - I_1| < T(I_1)\}$$

In a preferred embodiment, the tolerance T is the same as described in the definition of the homogeneous set H.

As described above, the luminance pair of brightness values for a given homogenous pixel will fall into region D when the absolute value of the luminance difference $I_2 - I_1$ is less than the tolerance value T, will fall into the region L when $I_2$ is greater than $I_1$ by an amount equal to or greater than the tolerance value and will fall into region R when $I_2$ is less than $I_1$ by an amount equal to or greater than the tolerance value. Another way of describing the process represented by the diagram of FIG. 3 is that the pair of luminance values falls into the region L or R when there is a substantial change in the brightness value.

The set of homogeneous pixel H can be divided into subsets $H_L$, $H_D$, and $H_R$, where $H_X$ is the set of pixels p in H such that the luminance value pair $(I_1(p), I_2(p))$ falls in the sub-region X, i.e. L, D or R, of the square in FIG. 3. From the number of points that lie in each of the subsets of H, denoted as $|H_X|$, three ratios are defined with respect to the total number of pixels in H, $|H|$. These ratios, $p_L := |H_L|/|H|$, $p_D := |H_D|/|H|$ and $p_R := |H_R|/|H|$, denote the relative parts of the homogeneous pixels whose brightness changes correspond with points in the sets L, D, and R. Since each point $(I_1(p), I_2(p))$ is either an element of L, D, or R, the ratios fulfill the constraint $p_L + p_D + p_R = 1$. The use of the ratios allows the classification of the transitions to be independent of the size of the set of homogeneous pixels.

Figure 4:
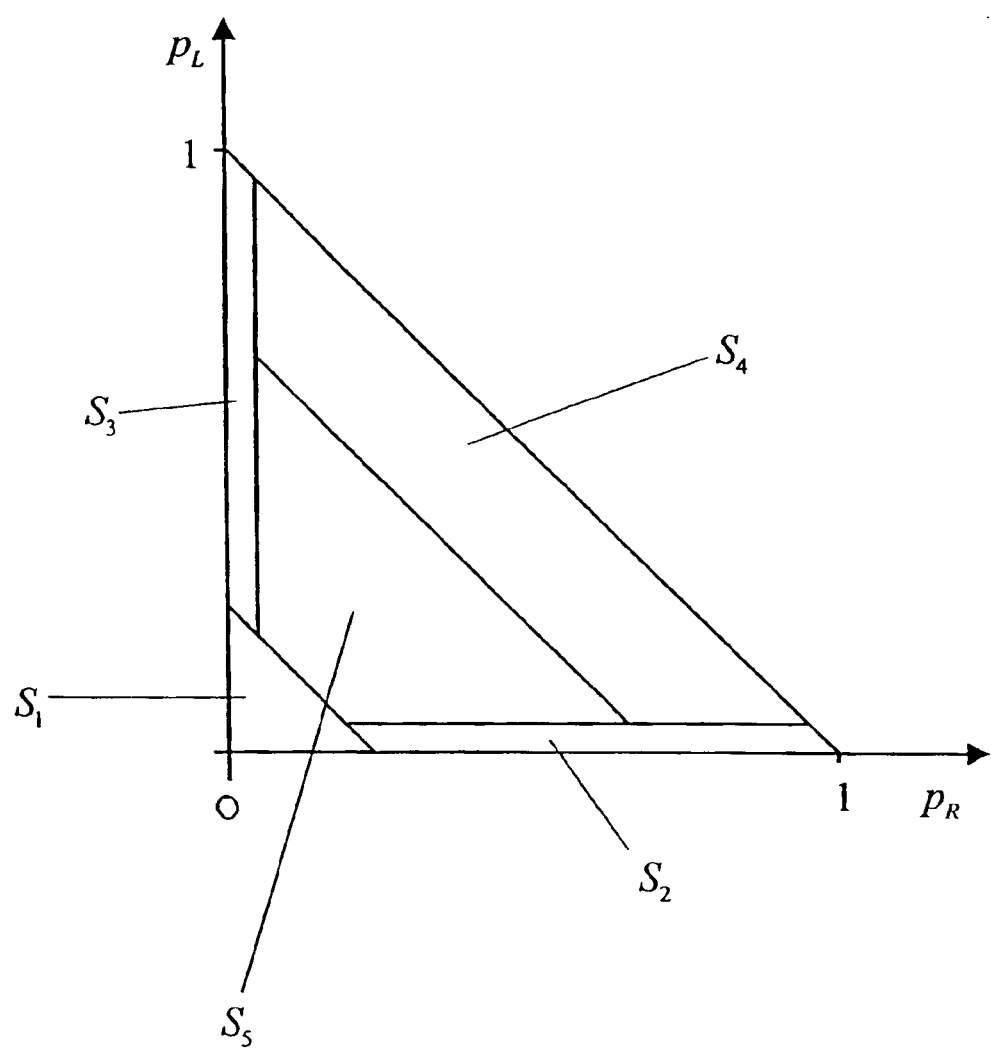
FIG. 4 depicts the five brightness change classification subsets.

Each transition from the first frame to the second frame can therefore be characterized by a pair $(p_R, p_L)$ of ratios defining a point lying in the triangle S shown in FIG. 4. The triangle S is defined as the set of points $(p_R, p_L)$ in $[0,1] \times [0,1]$ where each of the points satisfies $p_R + p_L \leq 1$. Triangle S is divided into five disjoint sub-sections $S_1$ through $S_5$, according to the present invention, as seen in FIG. 4. If point $(p_R, p_L)$ falls in sub-section $S_k$, wherein $S_k$ is one of the subregions $S_1$ through $S_5$ the point is said to be in class k. The class k determines the following consequences,:

k=1: The transition is classified as "harmless", and motion estimation is performed without any modification;

k=2: The transition is classified as "brighten image 2". Image 2 is then scaled by the following equation:

$$\hat{I}_2(p) = \min\left(I_{max}, \frac{\text{mean}(I_1)}{\text{mean}(I_2)} \cdot I_2(p)\right)$$

before motion estimation is performed, where mean (I) is defined as the sum of all luminance values in image I divided by the number of pixels in the image;

k=3: The transition is classified as "brighten image 1". Image 1 is then scaled by the following equation:

$$\hat{I}_1(p) = \min\left(I_{max}, \frac{\text{mean}(I_2)}{\text{mean}(I_1)} \cdot I_1(p)\right)$$

before motion estimation is performed;

k=4: The transition is classified as "scene-shift" and no motion estimation is performed; and k=5: The transition is classified as "unclear" and motion estimation is performed without any modification.

In a preferred embodiment, the disjoint sets $S_1$, $S_2$, $S_3$, $S_4$ and $S_5$ can be defined as follows:

$S_1 := \{(p_R, p_L) \in S : p_R + p_L < 0.18\}$ $S_2 := \{(p_R, p_L) \in S : p_R + p_L \geq 0.18 \wedge p_L < 0.01\}$ $S_3 := \{(p_R, p_L) \in S : p_R + p_L \geq 0.18 \wedge p_R < 0.01\}$ $S_4 := \{(p_R, p_L) \in S : p_R + p_L \geq 0.55 \wedge p_L \geq 0.01 \wedge p_R \geq 0.01\}$.

$S_5 := \{(p_R, p_L) \in S : p_R + p_L \geq 0.18 \wedge p_R + p_L < 0.55 \wedge p_L \geq 0.01 \wedge p_R \geq 0.01\}$ Thus, as described above, a pair of ratios $p_L$ and $p_R$ will fall in $S_1$ when the ratios $p_L + p_R$ is less than 0.18, or in other words when the ratio of the homogenous pixels undergoing a substantial change to the total number of homogenous pixels is less than 0.18. The pair of ratios will fall into region $S_2$ when the sum of the ratios $p_R + p_L$ is greater than or equal to 0.18 and $p_L$ is less than 0.01. The pair of ratios will fall in the region $S_3$ when the sum of $p_R$ and $p_L$ is greater than or equal to 0.18 and the ratio $p_R$ is less than 0.01. The pair of ratios falling in region $S_2$ or $S_3$ wherein the brightness of one of the frames is adjusted, requires that either $p_L$ or $p_R$ be less than 0.01. This means that substantially all of the substantial changes in brightness, more than 99%, are all in the same direction. If $p_L$ is less than 0.01 this means that substantially all of the homogenous pixels undergoing a substantial change in brightness are decreasing in brightness wherein $I_1$ is greater than $I_2$ so that the luminance values $I_2$ of the second frame are brightened. On the other hand, if $p_R$ is less than 0.01, this will mean that substantially all of the homogenous pixels undergoing a substantial change in brightness are increasing in brightness wherein $I_2$ is greater than $I_1$ so that the luminance values $I_1$ of the first frame are brightened.

If the pair of ratios $p_R$ and $p_L$ fall in region $S_4$ which is the case if the sum of the ratios $p_L + p_R$ is greater than 0.55 and the individual ratios are greater than or equal to 0.01, this means that more than half of the pixels have a significant brightness change but no direction is favoritized. Under these circumstances, a scene shift is determined to have occurred. When the pair of ratios falls in the region $S_5$, this means that the sum of the ratios $p_L + p_R$ is greater than 0.18 and is less than 0.55 and both $p_L$ and $p_R$ are greater than or equal to 0.01. As indicated above, when the pairs of ratios falls in region $S_5$, no clear determination as to whether a brightness adjustment should be made and accordingly the motion estimation is performed without any brightness modification.

In the above described system, the homogenous pixels in the first frame of a pair of frames to be analyzed are determined. Alternatively, the homogenous pixels in the second frame of a pair of frames could be identified or the homogenous pixels in both frames could be identified before carrying out the remainder of the algorithm to identify scene shifts and to determine whether or not the brightness of one of the frames should be modified before the motion estimation calculation. A key feature of the invention as described above is the identification of homogenous pixels in at least one of the pair of adjacent frames between which motion estimation is to be calculated or between which it is to be determined whether or not a scene shift has occurred. Following this determination, the need for a brightness adjustment in one of the two frames is assessed in accordance with the specific algorithm described above. Similarly, a scene shift is detected in accordance with this specific algorithm. Instead of using this specific algorithm it will be apparent to those skilled in the art, that other algorithms could be employed on the identified homogenous pixels to assess the need for brightness adjustment and/or to detect whether a scene shift has occurred.

The above description is of a preferred embodiment of the invention and modification may be made thereto without departing from the spirit of the scope of the invention, which is defined in the appended claims.

What is claimed is:

1. A method of determining whether a scene shift has occurred between a first frame and a second frame of a motion picture sequence of frames wherein said frames are represented by pixels comprising:
    identifying the homogeneous pixels in said first frame, a homogeneous pixel being one in which the brightness of such homogeneous pixel is within a predetermined tolerance of all the pixels in a predetermined neighborhood surrounding such homogeneous pixel,
    identifying changes of luminance of said homogeneous pixels from the first frame to the second frame;
    classifying transitions of said homogeneous pixels according to said identified changes; and
    determining whether a scene shift has occurred based in part on the number of such homogeneous pixels undergoing a substantial change in brightness from said first frame to said second frame relative to the total number of said homogeneous pixels in said first frame.

2. A method as recited in claim 1 wherein the determining of whether a scene shift has occurred is based in part on whether the ratio of said homogeneous pixels undergoing a substantial change in brightness from said first frame to said second frame to said total number of homogeneous pixels exceeds a predetermined value.

3. A method as recited in claim 2 wherein it is determined that a scene shift has occurred when said ratio exceeds a predetermined value and substantially all of the changes in brightness are not in the same direction.

4. A method for estimating and adjusting the brightness of adjacent frames of sequential frames of a motion picture for optical flow calculations comprising:
    identifying homogeneous pixels in a first frame of a pair of adjacent frames of said motion picture, a homogeneous pixel being one in which the brightness of such homogeneous pixel is within a predetermined tolerance of the brightness of all the pixels in a predetermined neighborhood surrounding such homogeneous pixel, and
    adjusting the brightness of one of the said adjacent frames in accordance with the changes in brightness of said homogeneous pixels between said first frame and said second frame, wherein the brightness of one of said first and second frames is adjusted to correspond to the brightness of the other one of said first and second frames when the ratio of said homogeneous pixels undergoing a substantial brightness change to the total number of said homogeneous pixels in said first frame exceeds a predetermined value, and substantially all the substantial changes in the brightness of said homogeneous pixels between said first frame and said second frame are in the same direction.

5. A method as recited in claim 4 further comprising determining the optical flow between said adjacent frames after the brightness of said first frame or said second frame has been adjusted.

6. A method of determining luminance changes between a first frame and a second frame of a sequence of frames comprising:
    determining a set of homogeneous pixels in the first frame;
    identifying changes of luminance of said set of homogeneous pixels from the first frame to the second frame according to differences in luminance values relative to a first tolerance; and
    classifying transitions of said set of homogeneous pixels according to said identified changes.

7. The method according to claim 6, wherein said classifying step further comprises:
    determining a first ratio of pixels from said set of homogeneous pixels whose subtraction of luminance values of the first frame from luminance values of the second frame is greater than or equal to a second tolerance; and
    determining a second ratio of pixels from said set of homogeneous pixels whose subtraction of luminance values of the second frame from luminance values of the first frame is greater than or equal to said second tolerance.

8. The method according to claim 7, further comprising: determining a class of said transitions according to said first ratio and said second ratio.

9. The method according to claim 8, further comprising: determining a scene shift occurred according to said class.

10. The method according to claim 8, further comprising: maintaining luminance values in the first frame and the second frame according to said class.

11. The method according to claim 8, further comprising: estimating motion according to said class.

12. The method according to claim 8, further comprising: updating luminance values of said set of homogeneous pixels of either the first frame or the second frame according to said class.

13. The method according to claim 12, wherein said updating step further comprises:
    for each pixel in said set of homogeneous pixels of the first frame or the second frame:
        scaling a luminance value of said pixel by a ratio of average luminance values of the first frame and average luminance values of the second frame; or
        replacing said luminance value of said pixel with a maximum luminance value.

14. The method according to claim 8, wherein said first threshold and said second threshold are equal.

* * * * *